United States Patent [19]

Reed, III

[11] Patent Number: 4,809,553
[45] Date of Patent: Mar. 7, 1989

[54] FLUTTER EXCITER

[75] Inventor: Wilmer H. Reed, III, Hampton, Va.

[73] Assignee: Dynamic Engineering Inc., Newport News, Va.

[21] Appl. No.: 74,357

[22] Filed: Jul. 16, 1987

[51] Int. Cl.$^4$ .......................... G01H 1/00; G01M 9/00
[52] U.S. Cl. ........................................ 73/583; 73/147; 73/671
[58] Field of Search ................. 73/147, 671, 180, 583

[56] References Cited

U.S. PATENT DOCUMENTS

| | | | |
|---|---|---|---|
| 2,950,619 | 8/1960 | Schuerch | 73/583 |
| 3,113,451 | 12/1963 | Beals, Jr. et al. | 73/583 |
| 3,552,192 | 1/1971 | Grosser | 73/71.5 |
| 3,895,515 | 7/1975 | Vetter et al. | 73/671 |
| 4,116,056 | 9/1988 | Bulychev et al. | 73/147 |
| 4,350,043 | 9/1982 | Jones | 73/671 |
| 4,475,385 | 10/1984 | Farmer | 73/147 |

Primary Examiner—Donald O. Woodiel
Attorney, Agent, or Firm—Joseph Scafetta, Jr.

[57] ABSTRACT

A flutter exciter induces vibration either for actual aircraft flight testing or for wind tunnel model testing. The basic flutter exciter unit is a pair of rotatable concentric cylinders mounted on either a fixed vane or an aircraft wing or a tail surface. Each cylinder has a slot which allows the air flow to pass therethrough. By rotating the cylinders together, oscillating air pressures are induced on the fixed vane or the aircraft surface to which the cylinders are attached. The cylinders may be mounted at a trailing edge of either the fixed vane or the aircraft wing, to any tail surface, or on any other lifting surfaces of the aircraft itself. Thus, because the flutter exciter can be made as a completely self-contained unit, it may be simply mounted to any suitable hard point on either the test model or the aircraft. The power required to rotate the slotted cylinders is minimal, thus allowing the use of a low wattage motor.

15 Claims, 3 Drawing Sheets

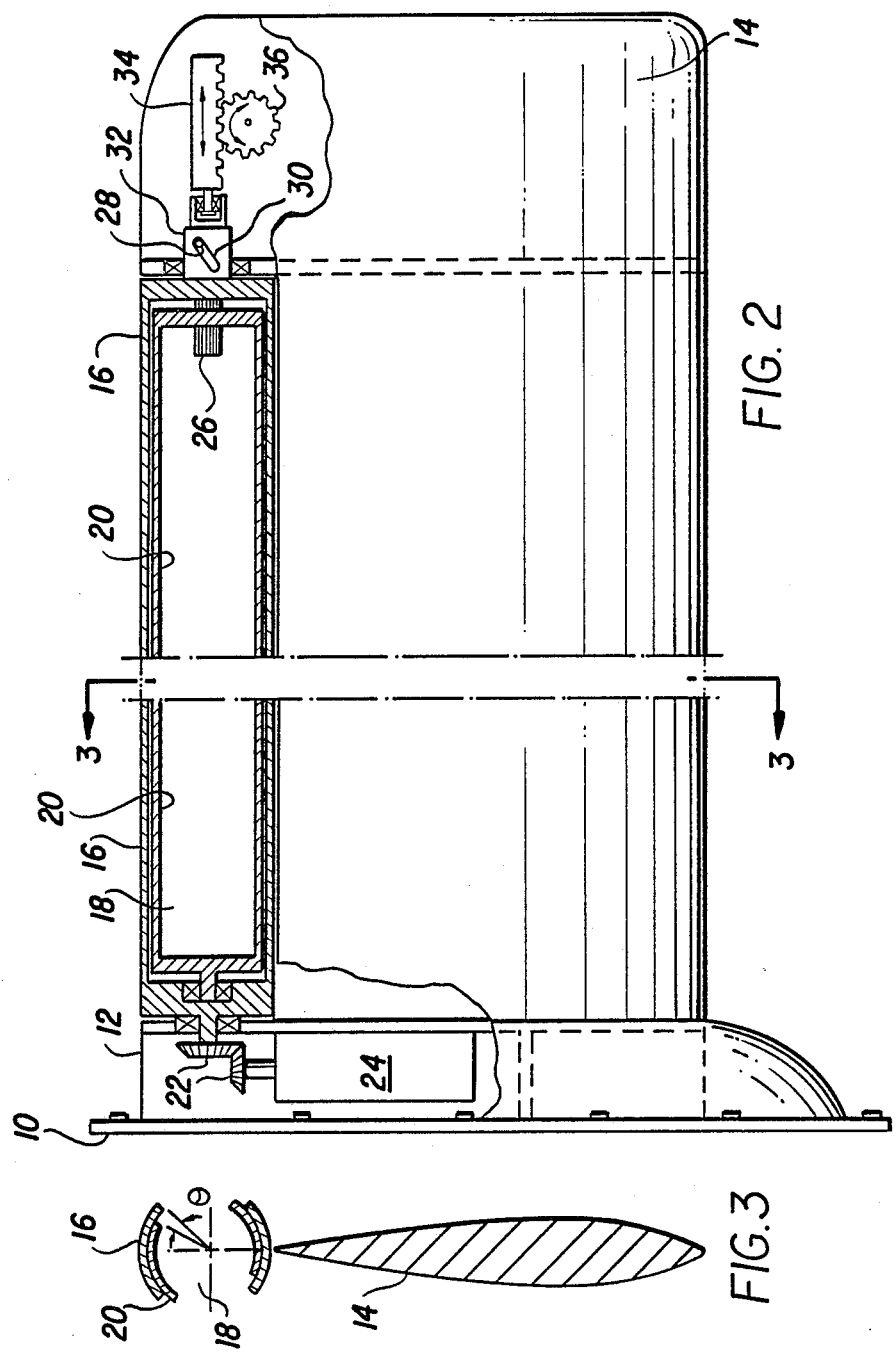

FLUTTER EXCITER

BACKGROUND OF THE INVENTION

1. Field of the Invention

This invention relates generally to aerodynamic wing study and specifically to a device for inducing flutter in an aircraft wing during structural dynamic testing thereof.

2. Description of the Related Art

Flight flutter and structural dynamic testing of aircraft generally requires a method of exciting the structure beyond the use of free stream turbulence or "stick raps" by the pilot. Aircraft control surfaces can provide such excitation if the flight control actuator has sufficient output over the frequency range of interest. Since flight control actuators are usually not designed for high frequency operation, some form of external exciter system is typically used. The two primary types of exciters are inertial and aerodynamic.

Inertial exciters are unbalanced masses driven by either an hydraulic or an electric motor. The primary disadvantages of inertial exciters are their large size and their heavy weight. Correspondingly, large motors are required to drive the large masses of such inertial exciters.

Aerodynamic exciters are external lifting surfaces which are pitch-oscillated to obtain the required excitation forces. Aerodynamic vanes on small surfaces of the wing are quite efficient in generating the dynamic forces required for flight flutter tests. Typically, they require hydraulic actuation because of the relatively large power required to overcome aerodynamic and inertial loads. This requirement for hydraulic power adds a considerable complication to the installation of such a system. Quite often, the cost becomes prohibitive.

U.S. Pat. No. 3,552,192 was issued to Grosser on Jan. 5, 1971, for a rotary excitation device. In the flutter exciter system of Grosser, a rotating aerodynamic vane is mounted adjacent to the surface of the outer tip of an aircraft wing or horizontal stabilizer at right angles to the direction of flight. Grosser's excitation device comprises a vane which rotates at a constant rate about its mid-chord axis. Because the chordwise center of pressure of the rotating vane changes with the angular position of the vane during each rotation cycle, the torque and consequently the power required to drive the system can become a major deterrent in implementing the concept of Grosser's flutter exciter system.

Therefore, it remains a problem in the prior art technology to provide a flutter exciter system which imposes minimal power demands on existing hydraulic or electrical systems of the aircraft. Also, it remains a problem to make a completely self-contained flutter exciter unit which may be simply mounted to any suitable hard point on the aircraft.

SUMMARY AND OBJECTS OF THE INVENTION

The present invention may be summarized as a relatively simple aerodynamic flutter exciter electrically driven with very small power requirements. The performance characteristics of the flutter exciter comprising the present invention, as measured in a low speed wind tunnel, indicate that, although the force-producing capability of the flutter exciter is equivalent to the capability of a comparably sized flutter exciter of the oscillating vane-type, the power requirements of the present invention are very much smaller than the power requirements of such oscillating vane-type flutter exciter. Thus, this low input power demand makes feasible the use of a small electric motor which can be powered either by the direct current electrical system on board the aircraft or by a rechargeable battery pack.

Thus, the primary object of the present invention is to provide a self-contained flutter exciter unit which can be mounted at any suitable hard point on the aircraft with minimal installation difficulty and cost.

It is another object of the present invention to provide a flutter exciter system to replace current flight testing procedures which involve the use of atmospheric turbulence as a means of excitation so that dependence on the whims of nature, which often cause costly schedule delays, can be avoided.

It is a further object of the present invention to provide a strap-on structural flutter excitation system installed to be used repeatedly for testing a wide variety of research aircrafts.

It is another object of the present invention to provide a device for inducing flutter during the structural dynamic testing of an aircraft model in a wind tunnel.

A key advantage offered by the present invention over the known prior art technology is that the low input power required produces a relatively high level of dynamic excitation force.

This advantage and other features of the present invention will become more readily apparent from the following brief description of the drawings and the accompanying detailed description of the preferred embodiments.

BRIEF DESCRIPTION OF THE DRAWINGS

FIG. 2 is a top plan view of the flutter exciter of the first embodiment with parts broken away to show the rotary flap drive unit and the slot opening mechanisms.

FIG. 3 is a cross-sectional view of the flutter exciter of the first embodiment taken along line 3—3 in FIG. 2.

DETAILED DESCRIPTION OF THE PREFERRED EMBODIMENTS

Figure 1:
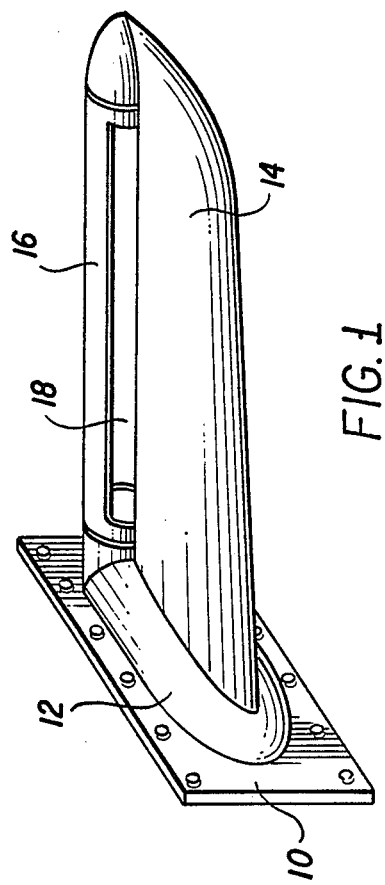
FIG. 1 is a perspective view of the flutter exciter of a first embodiment of the present invention with a rotating slotted cylinder along the trailing edge of a fixed vane.

FIG. 1 depicts the primary components of the flutter exciter system which may be mounted either on a model being tested in a wind tunnel or on an actual aircraft being tested in the atmosphere. A base plate 10 carries a pod 12 on which a fixed vane 14 is mounted in a cantilevered manner to a wing tip or an empennage of either a wind tunnel model or a full-scale aircraft.

As shown in FIG. 2, the basic flutter exciter unit includes a rotating slotted outer cylinder 16 and a rotating slotted inner cylinder 20 both located at a trailing edge of the fixed vane 14. Two spanwise slots 18, symmetrically aligned on opposite quadrants of the cylinders 16 and 20, provide for the passage of air flow through the slots 18 such that, when the cylinders 16 and 20 rotate together, the air flow is directed upwardly and downwardly twice during each rotational cycle. Since the cylinders 16 and 20 rotate together at a uniform or slowly varying speed, the inertia loads normally associated with an oscillating trailing edge control surface are not present. Furthermore, the aerodynamic hinge moments due to control surface deflection are essentially zero for the rotating flap because the aerodynamic forces acting on opposite sectors of the cylinders 16 and 20 tend to cancel each other. Thus, the two primary sources of power consumption found in conventional oscillating vane systems, i.e. inertia and aerodynamic hinge moments, are virtually eliminated in the flutter exciter of the present invention.

FIG. 2 further illustrates a mechanism for remotely changing the open area in the spanwise slots 18. The area is open in the slots 18 for the passage of the air flow therethrough and, consequently, the dynamic excitation force is determined by the angular relation between the two concentric slotted cylinders 16 and 20.

As shown in FIG. 3, the inner cylinder 20 may be rotated independently of the outer cylinder 16 so that the slot 18 at the trailing edge of the fixed vane 14 is fully opened when an angle $\theta$ between the edges of the outer cylinder 16 and the inner cylinder 20 is zero and is fully closed when the angle $\theta$ is 90°. In other words, the inner cylinder 20 is rotated independently only when it is desired to change the size of the opening in the slot 18 in order to adjust the amplitude of the vibration caused by the flutter exciter.

Returning to FIG. 2, the outer cylinder 16 is driven through bevel gears 22 by a variable speed direct current motor 24. The inner cylinder 20 is connected to and rotates with the outer cylinder 16 via a splined shaft 26. This shaft 26 is driven by the outer cylinder 16 through a pin 28 that projects from the splined shaft 26 through a slot 30 in a collar 32 attached to the right hand end of the outer cylinder 16. Thus, in the manner of a so-called "Yankee screwdriver", if the splined shaft 26 is moved axially, the shaft 26 also rotates relative to the collar 32 through an angle $\theta$ which is determined by the pitch of the slot 30 which, although shown straight in FIG. 2, actually spirals helically around the cylindrial portion of the collar 32. Since the inner cylinder 20 is connected to the splined shaft 26, such inner cylinder 20 also rotates continuously with the outer cylinder 16 at the same angle $\theta$ relative to the outer cylinder 16. The axial position of the splined shaft 26 can be shifted by a rack 34 and a pinion gear 36 actuated by a second motor (not shown).

In addition to the control of the dynamic force amplitude, by the use of a conventional electronic phase-control circuit (not shown) connected to the first motor 24 and the second motor (not shown), two or more flutter exciter units of the present invention can be driven either in phase or 180° out of phase with each other so as to emphasize symmetric or antisymmetric vibration modes.

Figure 4A:
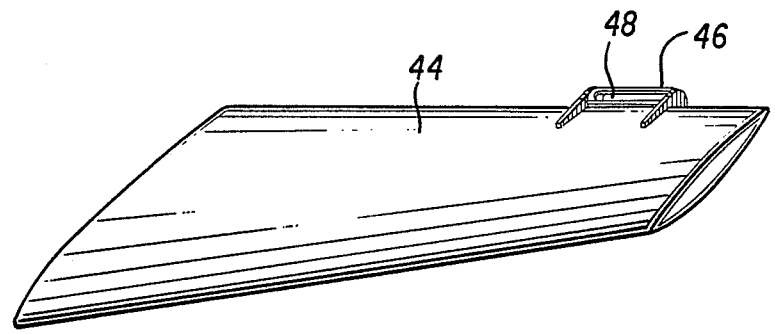
FIG. 4A is a perspective view of the flutter exciter of a second embodiment of the present invention with a rotating slotted cylinder mounted along the trailing edge of the aircraft.
Figure 4B:
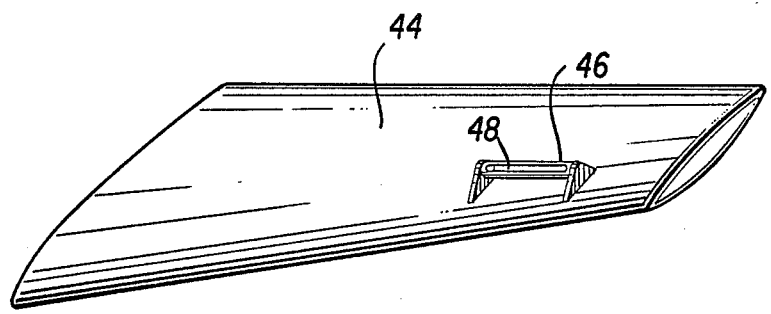
FIG. 4B is a perspective view of the flutter exciter of a third embodiment of the present invention with a rotating slotted cylinder mounted on a surface of a wing or a tail of the aircraft.

FIGS. 4A and 4B show two alternative embodiments of the flutter exciter of the present invention. A lifting surface 44, such as a wing or an empennage of an aircraft or a wind tunnel model, has either one of two rotating cylinders 46 with an open spanwise slot 48 mounted at a selected location on the lifting surface 44, e.g., along the trailing edge in FIG. 4A and on the upper surface in FIG. 4B. Each rotating outer cylinder 46 contains a rotating inner cylinder 20 shown in FIG. 2. For the two examples of the trailing edge and the upper surface shown in FIGS. 4A and 4B, the dynamic excitation force is induced by pressure changes across the lifting surface 44 itself rather than across the separate fixed vane 14 which would be mounted at a tip of the lifting surface 44 or the empennage by the base plate 10 shown in FIGS. 1–3. However, the embodiment shown in FIG. 4B may also be mounted on an undersurface of the wing, on either an upper or a lower surface of a horizontal tail fin, or on a side surface of a vertical tail section.

The operation of the flutter exciter of the present invention may be simply described as follows. The excitation frequency can be varied by electrically controlling the rotational speed of the first motor 24 shown in FIG. 2. Referring to FIG. 3, the amplitude of excitation force can be controlled either remotely by electrical devices (not shown) wired to the second motor (not shown) or mechanically preset by varying the opening of the slot 18 in the outer cylinder 16 by independently rotating the inner cylinder 20 to a selected angle $\theta$. On a model aircraft structure on which any of the three embodiments shown in FIGS. 1, 4A and 4B are used for testing in a wind tunnel, the air flow passes through the slots 18 or 48 in the cylinders 16 or 46 and is redirected in order to induce flutter in the model aircraft structure. Measurements are then taken by various conventional instruments (not shown) of the amount of vibration or flutter induced in the aircraft structure.

On an actual aircraft in which any of the three embodiments shown in FIGS. 1, 4A and 4B are used for testing purposes in the atmosphere, the plane must first achieve flight suitable for testing. For example, a pilot may seek level stable flight and then either the pilot or a technician remotely controls the operation of the flutter exciter by adjusting the rotational speed of the first motor 24 to control the frequency of rotation of the two concentric cylinders 16 and 20 and by adjusting the size of the opening in the slot 18 or 48 to control the amplitude of the excitation force. Measurements of the amount of dynamic response excited in the wing 44 or empennage are subsequently recorded by conventional instrumentation packages (not shown) on board the aircraft.

The aerodynamic performance and power requirements of the flutter exciter of the present invention have been demonstrated on a two-dimensional model of a fixed vane 14 in a wind tunnel at low speeds and at low Reynolds numbers to be more satisfactory than known prior art devices for exciting flutter. In one example, the maximum change in lift with the changing position of the cylinder 16 occurred when the vane chord was approximately four times the diameter of the rotary cylinder 16. The maximum lift coefficient variation for the condition was ±0.35. Thus, at an airspeed of about 500 miles per hour, this lift coefficient would produce a dynamic lift force of nearly ±300 pounds per square foot of area (vane plus flap).

The foregoing preferred embodiments are considered illustrative only. Numerous other modifications will readily occur to those persons skilled in aeronautical technology after reading the foregoing specification. Consequently, the exact construction and operation shown and described above is not limited thereto but rather is defined by the following claims.

I claim:

1. A device for exciting flutter modes in an aircraft during testing, comprising:
   a rotatable cylinder means, mounted on the aircraft, for imparting oscillatory aerodynamic forces to the aircraft, said cylinder means having slotted means for allowing the air to pass therethrough.
2. The device, according to claim 1 wherein: said cylinder means is mounted to a fixed vane at a tip of a wing or an empennage on the aircraft.
3. The device, according to claim 1, wherein: said cylinder means is mounted at a trailing edge of the aircraft wing.
4. The device, according to claim 1, wherein: said cylinder means is mounted on an upper surface of a wing or an empennage of the aircraft.
5. The device, according to claim 1, wherein: said cylinder means includes an outer cylinder and an inner cylinder concentric with the outer cylinder.
6. The device, according to claim 5, further comprising:
   motor means, mounted in communication with the cylinder means, for rotating the outer cylinder and the inner cylinder together.
7. The device, according to claim 5, further comprising:
   means, connected between the outer cylinder and the inner cylinder, for rotating the inner cylinder through an angle relative to the outer cylinder.
8. The device, according to claim 7, wherein: said inner cylinder rotating means includes a splined shaft, a collar having a slot therein, and a pin projecting from the splined shaft through the slot in the collar.
9. The device, according to claim 8, further comprising:
   means, connected to the splined shaft, for moving said splined shaft axially.
10. The device, according to claim 9, wherein: said moving means includes a rack and a pinion gear.
11. The device, according to claim 1, wherein: said slotted means includes two spanwise slots symmetrically aligned on opposite quadrants of the cylinder means.
12. The device, according to claim 1, wherein: said aircraft is a model mounted in a wind tunnel.
13. The device, according to claim 1, wherein: said cylinder means is mounted to a fixed vane installed on the aircraft at a location which is effective in exciting a vibration mode.
14. The device, according to claim 1, wherein: said cylinder means is mounted on a lower surface of a wing or an empennage of the aircraft.
15. The device, according to claim 1, wherein: said cylinder means is mounted on a lifting surface of the aircraft.

* * * * *

UNITED STATES PATENT AND TRADEMARK OFFICE
CERTIFICATE OF CORRECTION

PATENT NO. : 4,809,553

DATED : March 7, 1989

INVENTOR(S) : Wilmer H. Reed, III

It is certified that error appears in the above-identified patent and that said Letters Patent is hereby corrected as shown below:

Cover page, left column, Section [56] References Cited, line 5, change "9/1988" to --9/1978--.

Signed and Sealed this

Fifteenth Day of August, 1989

Attest:

DONALD J. QUIGG

Attesting Officer

Commissioner of Patents and Trademarks